March 10, 1953  I. H. SHAFFER  2,631,043
TRAILER STEERING MECHANISM
Filed Sept. 17, 1947  3 Sheets-Sheet 1
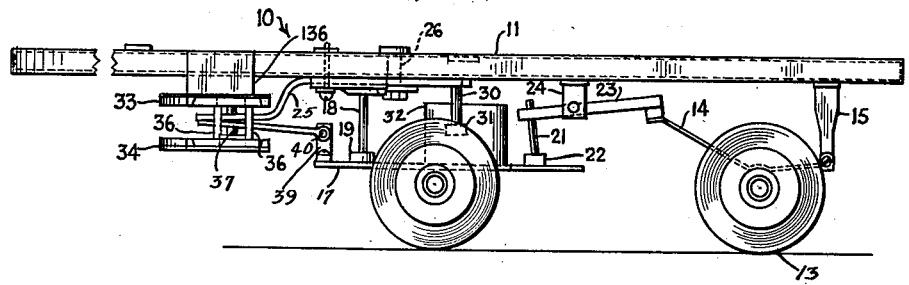
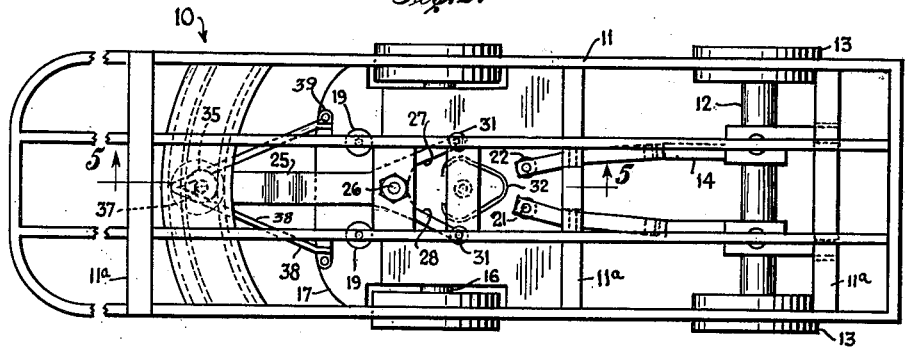
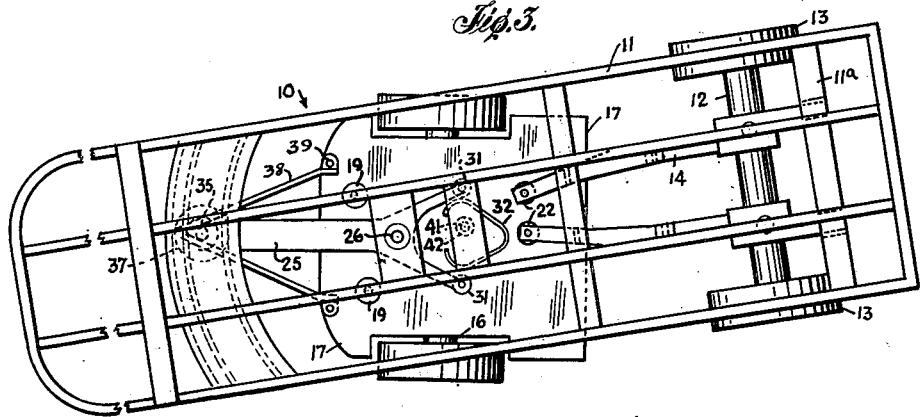
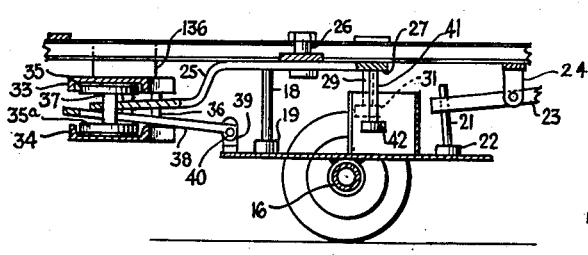
INVENTOR
Ivan H. Shaffer
BY
West & Oldham
ATTORNEY

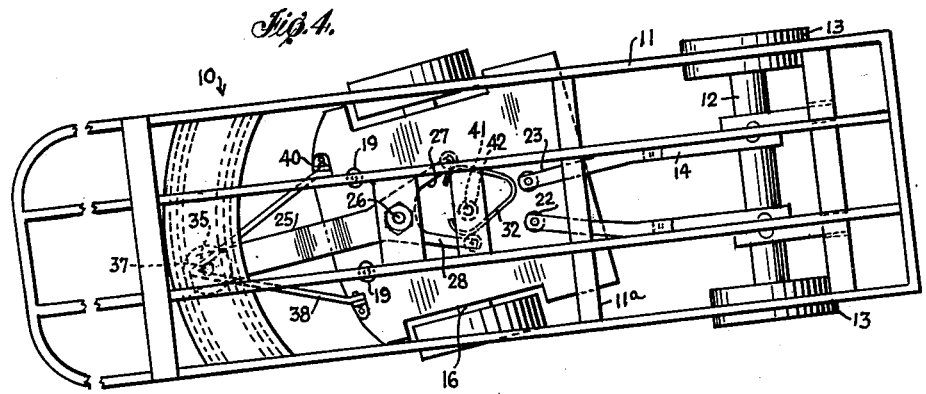
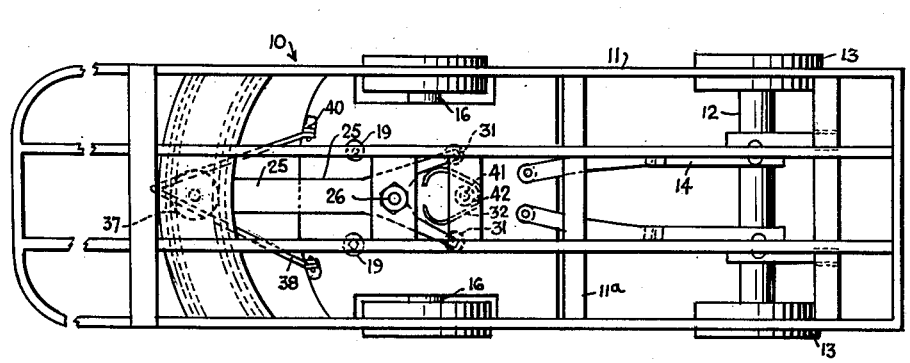
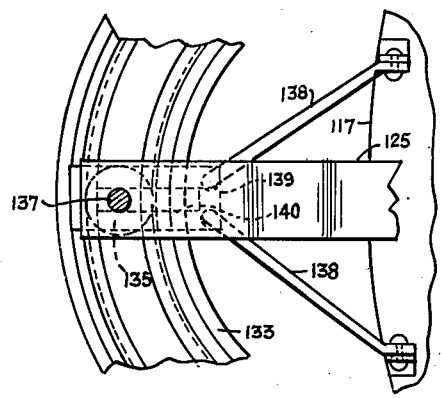

March 10, 1953 I. H. SHAFFER 2,631,043
TRAILER STEERING MECHANISM
Filed Sept. 17, 1947 3 Sheets-Sheet 3

INVENTOR.
Ivan H. Shaffer
BY
West & Oldham

Patented Mar. 10, 1953

2,631,043

UNITED STATES PATENT OFFICE 2,631,043

TRAILER STEERING MECHANISM

Ivan H. Shaffer, Cleveland, Ohio

Application September 17, 1947, Serial No. 774,505

16 Claims. (Cl. 280—86)

This invention relates to steering means for trailers, especially to a large, steerable trailer used for hauling freight.

Heretofore large trailers, that are adapted to be coupled to and supported by tractors at their forward ends and be supported at their rear ends by one or more axles, have been provided for carrying large amounts of freight in an economical manner. The present tendency is to make trailers larger and larger so that they can carry more freight and one limitation on the size of trailers is that set up by various states which regulate the amount of load that can be applied to one axle, or one set of tires. Hence, the tendency in manufacture of large trailers today is that the trailers should be provided with two axles in tandem relation at the rear end of a trailer. In fact, some trailers have even been provided with three axles positioned in tandem at the rear end of the trailer.

In using these large modern trailers which have tandem axles, a major problem is presented in attempting to steer the trailer, since the one forward tandem axle should be movable in relation to the rear axle so as to permit the trailer to be turned on an arc centered on the rear axle. In many instances, this forward axle has not been movably positioned and in such cases, the tractor pulling the trailer would merely skid the forward of two tandem axles laterally so as to swing the trailer on an arc centered on the rear axle when making a turn.

Some efforts have been made to provide movable steering devices adapted for use with large trailers, but none of such devices known to me have been capable of positive steering control when the trailer is going in reverse. The steering devices heretofore provided usually comprises means useful only in steering the trailers on forward movement. Some small trailers have been provided with devices that allegedly will steer on both forward and reverse motion but such mechanisms are not suitable for use on large trailers that carry heavy loads.

The general object of the present invention is to avoid and overcome the foregoing and other disadvantages of and limitations in previous types of trailer steering devices and to provide a device which is characterized by its steering action being operable for both forward and reverse movement of the trailer.

Another object of the invention is to utilize the laterally directed forces set up in a trailer when the same is started to turn so as to facilitate such turning action.

A further object of the invention is to provide two steering controls for a movable axle of a tandem axle trailer whereby one control functions for forward movement of the trailer and the other for reverse movement.

Another object of the invention is to provide sturdy, uncomplicated, inexpensive, steering means for a tandem axle trailer.

The foregoing and other objects and advantages of the invention will be manifest as the specification proceeds.

Attention is directed to the accompanying drawings, wherein:

Fig. 1 is a side elevation of a trailer provided with steering apparatus embodying the principles of the invention;

Fig. 2 is a plan of the trailer of Fig. 1 when moving forwardly;

Fig. 3 is a plan similar to Fig. 2 with the start of the steering action being illustrated;

Fig. 4 is another plan similar to Fig. 2 indicating further progress of the steering action;

Fig. 5 is a fragmentary section on line 5—5 of Fig. 2;

Fig. 6 is a plan similar to Fig. 2 showing the device when the trailer is being backed in a straight direction;

Fig. 8 is a fragmentary enlarged plan of a modified yoke construction; and

Figure 7:
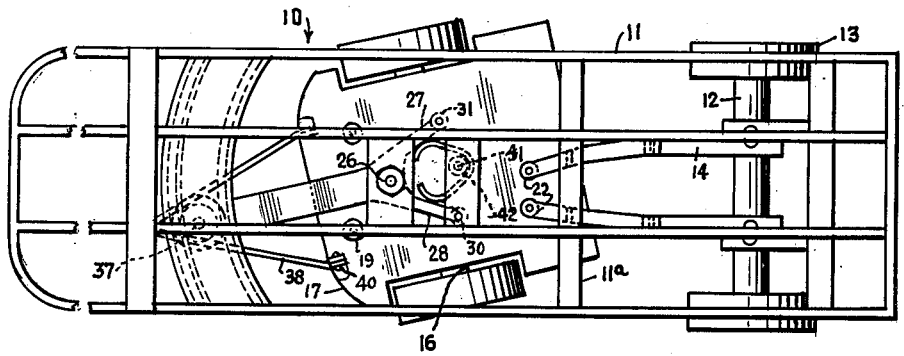
Fig. 7 is a fragmentary plan, similar to Fig. 6, showing progress in the turning action when backing.

Now referring in detail to the structure shown in the accompanying drawings, a tandem wheeled trailer having steering means associated therewith is shown generally at 10. The trailer 10 includes a frame 11 which is made from a plurality of longitudinally extending members that have transversely extending members 11ª associated therewith at spaced intervals. The frame 11 is provided with an axle 12 journalling wheels 13 thereon, with the axle 12 being fixedly secured to the trailer frame by means of springs 14 which are secured to the axle 12 and engage at one end with a support bracket 15, secured to the frame, in any conventional manner. The trailer 10 also is provided with an axle 16 which is movably associated with the remainder of the trailer. The axle 16 has a plate 17, usually formed of relatively heavy metal sheet, fixedly secured thereto. This plate 17 extends longitudinally of the trailer and may extend the full width thereof, as shown in the drawings. Load from the trailer 10 is carried on the axle 16 by means of a plurality of vertically extending supports 18 which have feet 19 pivotally secured thereto, and which are secured to the frame. These feet 19 are formed from conventional material, usually metallic, and merely have frictional engagement with the upper surface of the plate 17. As shown in Fig. 1, the supports 18 are positioned forwardly of the axle 16 while similar supports 21, having feet 22 pivotally secured thereto, are secured to equalizer arms 23 that are pivotally secured to brackets 24 extending downwardly from the trailer frame 11. The rearward ends of the equalizer arms 23 engage with the forward ends of the springs 14 in any desired manner so as to aid in coupling the axles 12 and 16 together for equal distribution of load therebetween.

The foregoing construction, it will be seen, contains no reference to any fixed connection between the axle 16 and the trailer frame 11 and this is a salient feature of the present invention so that relative lateral movement occurring between the trailer frame and the axle 16, when turning the trailer by a tractor, can be used to steer such axle and thus the trailer. Means for effecting this action are provided and they include a lever 25 which extends longitudinally of the frame 11 and is pivotally secured thereto intermediate its ends by a fulcrum pin 26. In the form of the invention illustrated herein, the rearward end of the lever 25 is bifurcated to provide arms 27 and 28. Each of these arms 27 and 28 carries a control arm 29 and 30, respectively, that extends downwardly therefrom. These control arms 29 and 30 carry rollers or other conventional low friction contact means 31 that extend therefrom at the lower ends thereof and are positioned thereby above the plate 17.

So as to control the lever 25 on forward movement of the trailer, a bracket 32 of substantially V-shape in section is secured to the upper surface of the plate 17 in any conventional manner so that said bracket 32 extends upwardly therefrom to the rear of the fulcrum pin 26. Fig. 2 clearly brings out that the control arms 29 and 30 and rollers 31 are so positioned that they are spaced laterally of the bracket 32. This indicates the normal position of the trailer frame 11 and movable axle 16 when the tractor, not shown, is pulling the trailer 10 in a straight line in a forward direction. The forward end of the lever 25 is provided to steer the plate 17 and is associated with an arcuate guide member, in this instance, a pair of opposed channels 33 and 34. The forward end of the lever arm 25 has rollers 35 and 35ᵃ associated with it, which rollers are received in the channels 33 and 34, respectively, which have suitable stop members 36 positioned at their ends so as to limit arcuate movement of the lever arm 25. The rollers 35 and 35ᵃ are mounted on a shaft or pin 37 that extends therebetween and is secured to the lever arm 25. The pin 37 also engages with steering means, such as a steering arm, or a yoke 38 which is pivotally secured to the plate 17 by means of brackets 39 one of which is engaged with each end of the yoke 38 by a pin 40 extending through the bracket and the end of the yoke 38 whereby slight pivotal movement of the yoke 38 is permitted. The stops 36 secure the channels 33 and 34 together and plates 136 may secure such unit to the frame 11 at each side thereof.

Fig. 5 of the drawing best indicates that the yoke 38 is engaged with the pin 37 so as to limit the rearward movement of the yoke and its associated means with relation to the pin 37, and the front end of the lever 25. However, certain relative movement axially of the trailer may occur without interfering with the connection between the yoke 38 and the lever 25 and from the position shown in Fig. 5, the yoke 38 and wheel and axle assembly may move forwardly of the trailer. In some instances, a bar or other stop means may be associated with the yoke 38 intermediate the forward and rear ends thereof so as to limit the relative forward movement of the yoke 38 with relation to the channels 33 and 34. This stop means may be necessary in order to make the connection between the movable axle and the frame 11 more desirable and safe for general truck operation.

Now, in operation of the steering device as hereinbefore explained, and only for operation when the trailer is being pulled forwardly thereof, the steering device will function to aid the movable axle 16 in properly positioning itself in relation to the trailer 10 so as to steer the frame 11 in a desired manner. To this end, the initial turning action of the trailer 10, caused by the tractor pulling the front end of it laterally, will occasion a sliding of the frame 11 laterally of the plate 17 and associated axle 16 so as to bring the roller 31 on either the control arm 29 or 30, depending upon the direction of movement, into engagement with the control bracket 32, as indicated in Fig. 3. The continued turning movement of the trailer 10 with effect arcuate movement of the lever 25 occasioned by continued relative lateral movement between the frame 11 and the plate unit 17. By forcing the arm 27 of the lever 25 outwardly of the trailer 10, the forward end of the lever 25 will be moved oppositely of the longitudinal axis of the trailer 10, again as indicated in Fig. 4. Such forced movement of the forward end of the lever 25 will, in turn, through the yoke 38, force the plate 17 and axle 16 to turn in the direction in which the means moving the trailer 10 is attempting to turn the trailer. Such turning movement of the lever arm, as applied to the plate 17 is multiplied, due to the lever arm ratios between the fulcrum 26 for the lever and the means controlling the position of the lever 25. This construction also enables a small relative lateral movement to effect the desired steering.

When it is desired to back the trailer 10 and still effect steering action, a further novel feature of the invention becomes apparent in that limited relative axial movement may occur between the trailer 10 and the axle 16 whereby such initial backing force when applied to the trailer 10 will slide the trailer 10 rearwardly with relation to the axle 16 and the mounting plate 17. In some instances, the braking action in stopping the trailer 10, inasmuch as such action is applied to the wheels mounted on the axle 16, will cause forward sliding action of the trailer frame 11 with relation to the axle 16. Thus, in all events, a further control arm or auxiliary guide, 41, which is secured to the frame 11 intermediate the control arms 29 and 30 and in a plane therewith and which may carry a roller 42, is brought into engagement with the apex of the bracket 32. Then a turning force applied to the trailer 10 will effect a skidding action of the trailer frame 11 laterally with relation to the plate 17 so as to cause slight lateral movement therebetween and this action will directly turn the plate and movable axle unit in the direction of the applied force so as to steer the movable axle assembly in the desired direction. Thus the trailer will be adapted to turn centered on its rear wheels.

Relative movement between the trailer 11 and the plate 17 may be facilitated in any desired manner, as by greasing or otherwise lubricating the top surface of the plate in any conventional manner. This lubrication will reduce the frictional forces between even a heavily laden trailer and a support plate so that the required limited relative lateral movement between the support plate, and associated axle means, and the trailer can be easily effected when the trailer is being pulled in an arcuate direction or being backed in an arcuate direction by its associated tractor. Likewise, the relative longitudinal axial movement of the plate 17 and associated axle and wheel assembly can readily be effected when changing the direction of movement of the trailer from forward to reverse or vice versa.

Figure 9:
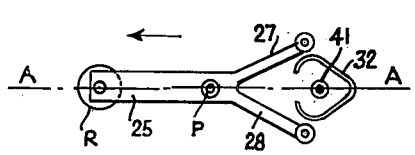
Figs. 9 through 13 are diagrammatic figures showing the principles controlling the steering action of the apparatus of the invention.
Figure 10:
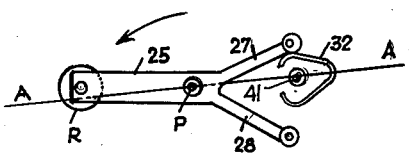
Figure 11:
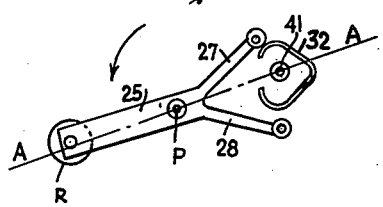

In order to show clearly the principles on which the steering action of the invention is effected, Figs. 9 to 13 are provided to illustrate diagrammatically how the steering action of the invention occurs. Thus, Fig. 9 shows the arrangement between the actual steering lever 25, which carries the roller R, and the bracket 32 which actually controls the position of the movable plate 17. In this instance, the longitudinal axis of the lever 25 coincides with the center line A—A of the trailer. Fig. 10 shows how the center line A—A of the trailer has had a movement angularly with relation to the lever 25 and has brought the arm 27 into engagement with the bracket 32. Fig. 11 illustrates that continued relative lateral movement between the trailer and support plate does not substantially change the relative positioning of the axes of the trailer and the lever 25. Such a continued movement laterally of the trailer moves the pivot point P for the lever and thereby effects arcuate movement of the lever 25 due to one end thereof bearing on the bracket 32 and the desired steering action is achieved.

Figure 12:
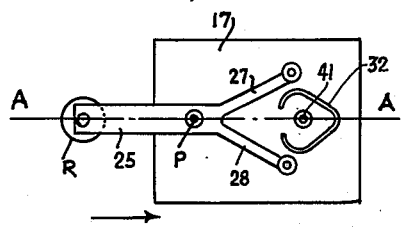
Figure 13:
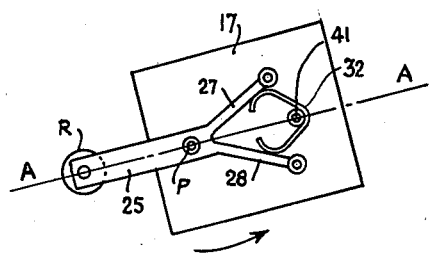

The steering action, above described, is used only when the trailer is being pulled forwardly by its prime mover, whereas Figs. 12 and 13 illustrate the action when the trailer is started to be backed and when turned when being backed. Thus, the control arm 41 is shown in engagement with the bracket 32 in Fig. 13 whereas such member 41 in the forward movement of the trailer is out of engagement with the bracket 32. Fig. 13 illustrates that the center lines of the trailer and lever remain superimposed when arcuate reverse movement of the trailer is effected after the movable axle is shifted to its foremost position by the initial backing movement. This relationship is maintained by engagement between the bracket 32 and the control arm 41 which effects a direct steering action on the plate 17 and associated axle and wheel means when the trailer is being backed in an arcuate reverse direction.

It will be seen that the actual structure used in the practice of the invention may be varied appreciably, as desired, without departing from the principles of the invention. To this end, one possible modification of the steering means of the invention is shown in Fig. 8 and, in this instance, a plate 117 pivotally carries steering arms 138 which engage with a plate member 139 in either a pivotal or a fixed manner, whichever is desired. The plate 139 is in turn provided with a longitudinally directed slot 140 therein that engages with a support pin 137 which in turn is secured to a lever arm 125. Thus, the pin 137 can move longitudinally of the plate 139 to only a limited extent which will in turn permit only limited longitudinal movement of the support plate 117 with relation to the remainder of the trailer. As in the previous form of the invention, the pin 137 carries conventional roller means 135 that engage with an arcuate guide device 133 of any desired construction whereby controlled arcuate movement of the forward end of the lever 125 is permitted. The plate member 139 is carried by the guide device 133 and is retained in position by means (not shown) that retain the pin 137 and lever arm 125 and device 133 in engagement.

Fig. 6 shows that the yoke 38 is moved forwardly with relation to the pin 37 when the trailer is backed up. This frees the yoke 38 from direct movement with the lever 25 and permits the plate 17 and axle 16 to be turned by the arm 41 and its engagement with the bracket 32, upon relative lateral movement of the plate 17 and frame 11. The arms 27 and 28 are preferably spaced from the bracket 32 when the trailer is being backed, although such clearance is not clearly shown in the drawings.

While one complete embodiment of the invention has been disclosed herein, it will be appreciated that modification of this particular embodiment of the invention may be resorted to without departing from the scope of the invention as defined by the appended claims.

Having thus described my invention, what I claim is:

1. A steering device for a tandem wheeled trailer, said steering device comprising a trailer frame, a lever arm, a fulcrum member for said lever arm secured to said trailer frame intermediate the ends of said lever arm, an axle movably associated with said trailer frame, a plate fixedly associated with said axle and extending forwardly and rearwardly of the trailer an appreciable distance, a plurality of support elements extending downwardly from said trailer frame and slidably engaging with said plate for transmittal of load to said axle, an equalizer member pivotally secured to said trailer frame, support elements carried by said equalizer member and bearing on said support plate on the longitudinally opposed portion of same with relation to said axle as said first mentioned support elements for retaining said plate substantially parallel to said frame, a pair of contact arms secured to the rearwardly directed end of said lever, a V-shaped rearwardly pointed guide plate secured to said plate and extending upwardly therefrom between and for engagement with said contact arms, a third contact arm associated with said trailer frame and positioned within said guide plate, one of said pair of contact arms and said guide plate being adapted to contact to move said lever arm relatively of the longitudinal axis of said trailer upon relative lateral movement of said movable axle and said trailer, an arcuate guide member secured to said trailer frame adjacent the front end of said lever, a roller member carried by the forward end of said lever arm and engaged with said guide member for arcuate movement with relation to the longitudinal axis of said trailer, said third contact arm being adapted to engage said guide plate for controlling the arcuate position of said axle on reverse movement of said trailer, and a steering arm associated with said roller member and engaged with said movable plate whereby arcuate movement of said lever arm by relative lateral movement between said movable axle and said trailer occasions a corresponding turning movement of said movable axle.

2. A steering device for a tandem wheeled trailer having two independent axles thereon, said steering device comprising a trailer frame, a lever arm, a fulcrum member secured to said trailer frame and engaged with said lever arm intermediate the ends thereof, an axle movably associated with said trailer frame, a plate fixedly associated with said movable axle and extending forwardly and rearwardly of the trailer an appreciable distance, a plurality of support elements extending downwardly from said trailer frame and frictionally engaging with said plate for transmittal of load to said axle, an equalizer member pivotally secured to said trailer frame, support elements carried by said equalizer member and bearing on said support plate on the longitudinally opposed portion of same with relation to said axle as said first mentioned support elements for retaining said plate substantially parallel to said frame, a contact arm secured to the rearwardly directed end of said lever, a guide plate secured to said plate and extending upwardly therefrom for engagement with said contact arm, said contact arm and said guide plate being adapted to contact to move said lever arm relatively of longitudinal axis of said trailer upon relative lateral movement of said movable axle and said trailer, an arcuate guide member secured to said trailer frame positioned below same adjacent the front end of said lever, a roller member carried by the forward end of said lever arm and engaged with said guide member for arcuate movement with relation to the longitudinal axis of said trailer, and a steering arm associated with said roller member and engaged with said movable plate whereby movement of said lever arm by relative lateral movement between said movable axle and said trailer occasions a corresponding turning movement of said movable axle.

3. In combination, an elongate trailer having at least two axles associated with the rear portion thereof, one of said axles being fixedly secured to said trailer and at least one of said axles being movably associated with said trailer, said movable axle having a longitudinally extending support device associated therewith, a plurality of support members associated with said trailer and bearing on said support device at transversely spaced portions thereof for sliding contact therewith, a lever arm extending axially of said trailer, a fulcrum pin pivotally securing said lever arm to said trailer for pivotal movement transversely thereof, transversely spaced guide arms carried by said lever arm at the rear portion thereof, a guide member fixedly associated with said plate, one of said guide arms being adapted to engage with said guide member to move said lever arcuately about said pivot on relative lateral movement between said movable axle and said frame in either direction, an arcuate guide device associated with said trailer forwardly of said movable axle, means movably engaging the forward end of said lever with said arcuate guide, and a steering yoke associated with the forward end of said lever and connected to said plate to transmit arcuate movement of said lever to said movable axle to turn same upon lateral movement of the trailer with relation to said movable axle.

4. In combination, an elongate trailer having at least two axles associated with the rear portion thereof, one of said axles being fixedly secured to said trailer and at least one of said axles being movably associated with said trailer, a horizontally positioned plate associated with said movable axle, a plurality of support members associated with said trailer and bearing on said plate for sliding contact therewith, a lever arm extending axially of said trailer, a fulcrum pin pivotally securing said lever arm to said trailer for pivotal movement transversely thereof, a guide member fixedly associated with said plate and adapted to engage with the rearwardly extending end of said lever to move same arcuately about said pivot on relative lateral movement between said movable axle and said frame, an arcuate guide device associated with said trailer forwardly of said movable axle, means movably engaging the forward end of said lever with said arcuate guide, and a steering yoke associated with the forward end of said lever and connected to said plate to transmit arcuate movement of said lever to said movable axle to turn same upon lateral movement of the trailer with relation to said movable axle.

5. A trailer steering device as in claim 4 wherein said movable axle is adapted to have limited longitudinal movement with relation to said trailer, and an auxiliary guide is secured to said trailer and adapted to engage said guide member for steering said movable axle only when such axle is in its forwardmost position.

6. In combination, an elongate trailer having at least two axles associated with the rear portion thereof, one of said axles being substantially fixedly secured to said trailer and at least one of said axles being movably associated with said trailer, a longitudinally extending plate associated therewith, a plurality of support members associated with said trailer and supported by said plate for sliding contact therewith, a lever arm extending axially of said trailer and having a bifurcated rear end, a fulcrum pin pivotally securing said lever arm intermediate its ends to said trailer for pivotal movement transversely thereof, a substantially V-shaped guide member fixedly associated with said plate and adapted to engage its sides with the rearwardly extending end of said lever to move same arcuately about said pivot on relative lateral movement between said movable axle and said frame, an arcuate guide device associated with said trailer forwardly of said movable axle, means movably engaging the forward end of said lever with said arcuate guide, and a steering member associated with the forward end of said lever and connected to said plate for limited axial movement, and to transmit arcuate movement of said lever to said movable axle to turn same upon lateral movement of the trailer with relation to said movable axle, said lever being adapted to disengage from said guide device upon forward movement of said movable axle which provides clearance between said lever and guide device.

7. A steering device for a tandem wheeled trailer, said steering device comprising a movable axle, a frame, wheels journaled on said axle, support means associated with said axle and transmitting load from said frame to said axle, said support means being adapted to permit relative sliding movement between said axle and said frame, a lever pivotally secured intermediate its ends to said frame, a pair of contact members secured to laterally spaced portions of the rear section of said lever, a guide bracket associated with said axle and adapted to engage with said contact members, said guide bracket normally being adjacent but out of contact with said contact arms and being positioned therebetween, means for guiding and limiting the arcuate movement of the forward end of said lever, means connecting the forward end of said lever to said axle for controlling the position of said axle by the position of said lever, said guide bracket being adapted on relative lateral movement between said axle and said frame to contact the said contact arm on the opposite side of said trailer from that direction in which said trailer is being turned so as to force the forward end of said lever and thereby said movable axle in the direction of the desired turn, said movable axle having limited axial movement of the trailer, said guide bracket being adapted to be moved out of association with said contact members when said movable axle is at its foremost position, and a contact device associated with said frame and adapted to be engaged with said guide bracket only when said movable axle is at its forwardmost position for effecting steering action of said axle upon reversal of said trailer.

8. A steering device for a tandem wheeled trailer, said steering device comprising a movable axle, a frame, wheels journaled on said axle, support means associated with said axle and transmitting load from said frame to said axle, said support means being adapted to permit relative sliding movement between said axle and said frame, a lever pivotally secured intermediate its ends to said frame, a pair of contact arms secured to laterally spaced portions of the rear section of said lever, a guide plate secured to said support member and adapted to engage with said contact arms, said guide plate being positioned between said contact arms, means for limiting the arcuate movement of the forward end of said lever, means connecting the forward end of said lever to said axle for controlling the position of said axle in relation to the position of said lever, said guide plate being adapted on relative lateral movement between said axle and said frame to force the said contact arm on the opposite side of said trailer from that direction in which said trailer is being turned laterally outwardly so as to force the forward end of said lever and thereby said movable axle in the direction of desired turn, said movable axle having limited axial movement of the trailer, and a contact arm associated with said frame and adapted to be engaged with said guide member only when said movable axle is at its forwardmost position for effecting steering action of said axle upon reversal of said trailer.

9. A steering device for a tandem wheeled trailer, said steering device comprising a movable axle, a frame, support means associated with said axle for transmitting load from said frame to said axle, said support means being adapted to permit relative sliding movement between said axle and said frame, a lever pivotally secured intermediate its ends to said frame, a guide plate associated with said support member adjacent the rear section of said lever, means for limiting the arcuate movement of the forward end of said lever, means connecting the forward end of said lever to said axle for controlling the position of said axle in relation to the position of said lever, means associated with said guide plate for controlling the position of said lever on relative lateral movement between said axle and said frame, and a contact member associated with said frame and adapted to be engaged with said guide plate only when said movable axle is at its forwardmost position for effecting steering action of said axle upon reversal of said trailer.

10. Steering means for a trailer comprising a trailer frame, an axle movably associated with said frame, control means movably associated with said trailer frame, a steering member associated with said movable axle and engaged with said control means for steering said movable axle on forward movement of the trailer by relative lateral movement between said movable axle and said control means, and means associated with said trailer frame and engaged with said movable axle for steering same on reverse movement of the trailer, said last named means being engaged with said movable axle only when same is in its foremost position with relation to said trailer frame.

11. A steering device for a tandem wheeled trailer, said steering device comprising a movable axle, a frame, support means associated with said axle for transmitting load from said frame to said axle, said support means being adapted to permit relative sliding movement between said axle and said frame, a lever pivotally secured intermediate its ends to said frame, a guide plate associated with said support member adjacent the rear section of said lever, means for limiting the arcuate movement of the forward end of said lever, means connecting the forward end of said lever to said axle for controlling the position of said axle in relation to the position of said lever, and means secured to said frame and associated with said guide plate for controlling the position of said lever on relative lateral movement between said axle and said frame.

12. In a tandem wheeled trailer having at least two transversely extending longitudinally spaced axles, which trailer has a front and a rear end, a trailer frame, a support plate secured to one of said axles and forming a unit therewith, means extending between and connecting said unit to said trailer frame, and a pair of support members carried by said trailer frame and extending downwardly therefrom to bear on said support plate, said support members having only gravity contact with said support plate, said support members being on longitudinally opposed sides of the said axle to which said support plate is secured.

13. A trailer as in claim 12 wherein said support plate is movable longitudinally and transversely of said trailer frame, steering means are provided to connect said unit to said trailer frame to steer said unit on forward movement of said trailer, and other steering means are provided to connect said unit to said trailer frame to steer said unit on rearward movement of said trailer, said steering means being individually engaged dependent upon the relative longitudinal positions of said trailer frame and said unit.

14. In a tandem wheeled trailer, a trailer frame, an axle, a support plate secured to said axle and forming a unit therewith, means extending between and connecting said unit to said trailer frame for movement therewith, a support member secured to said trailer frame and extending downwardly therefrom to said support plate, an equalizer bar member pivotally secured intermediate its ends to said trailer frame, and a second support member secured to one end of said equalizer member and extending down to said support plate, said support members being associated with longitudinally opposed portions of said support plate with relation to said axle.

15. A trailer as in claim 14 wherein a spring member is secured to a second axle positioned rearwardly of said axle, means securing one end portion of said spring member to said trailer frame, and means securing an opposed end portion of said spring to said equalizer.

16. A trailer as in claim 14 wherein said support member extends substantially vertically, and a foot member is pivotally secured to the lower end of said support member and bears on said support plate.

IVAN H. SHAFFER.

REFERENCES CITED

The following references are of record in the file of this patent:

UNITED STATES PATENTS

| Number | Name | Date |
|---|---|---|
| 1,666,921 | Warhus | Apr. 24, 1928 |
| 2,135,291 | Pinard | Nov. 1, 1938 |
| 2,154,957 | Pinard | Apr. 18, 1939 |
| 2,373,398 | Hoobler | Apr. 10, 1945 |
| 2,401,687 | Letzkus | June 4, 1946 |

FOREIGN PATENTS

| Number | Country | Date |
|---|---|---|
| 349,368 | Germany | Apr. 27, 1932 |